(12) United States Patent
Mayer

(10) Patent No.: US 9,045,040 B2
(45) Date of Patent: Jun. 2, 2015

(54) PTO DRIVELINES

(71) Applicant: AGCO International GmbH, Neuhausen am Rheinfall (CH)

(72) Inventor: Jakob Mayer, Ruderathshofen (DE)

(73) Assignee: AGCO International GmbH, Neuhausen am Rheinfall (CH)

( * ) Notice: Subject to any disclaimer, the term of this patent is extended or adjusted under 35 U.S.C. 154(b) by 0 days.

(21) Appl. No.: 14/051,531

(22) Filed: Oct. 11, 2013

(65) Prior Publication Data
US 2014/0102227 A1    Apr. 17, 2014

(30) Foreign Application Priority Data

Oct. 11, 2012 (GB) .................................. 1218234.1

(51) Int. Cl.
| | |
|---|---|
| B60K 25/06 | (2006.01) |
| B60K 17/28 | (2006.01) |
| F16D 13/72 | (2006.01) |
| F16D 13/74 | (2006.01) |
| F16D 25/12 | (2006.01) |
| F16D 13/54 | (2006.01) |
| F16D 25/0638 | (2006.01) |

(52) U.S. Cl.
CPC .................. *B60K 25/06* (2013.01); *B60K 17/28* (2013.01); *F16D 13/72* (2013.01); *F16D 13/74* (2013.01); *F16D 13/54* (2013.01); *F16D 25/0638* (2013.01); *F16D 25/123* (2013.01); *F16D 2300/0214* (2013.01)

(58) Field of Classification Search
USPC .......... 74/11, 15.2, 15.4, 15.66, 15.82, 15.84, 74/15.86; 192/12 R, 12 BA; 180/53.1, 53.6
IPC .......................................................... B60K 17/28
See application file for complete search history.

(56) References Cited

U.S. PATENT DOCUMENTS

| | | | |
|---|---|---|---|
| 6,378,682 B1 | 4/2002 | Mohan et al. | |
| 2007/0056822 A1 | 3/2007 | Porter et al. | |
| 2014/0102228 A1* | 4/2014 | Mayer | 74/15.82 |
| 2014/0251082 A1* | 9/2014 | Beasock et al. | 74/665 F |

FOREIGN PATENT DOCUMENTS

GB             835968 A        5/1960

OTHER PUBLICATIONS

GB Search Report for GB Application No. 1218234.1 dated Jan. 23, 2013.

* cited by examiner

*Primary Examiner* — Faye M Fleming

(57) ABSTRACT

A vehicle PTO driveline (10) in which a PTO input shaft (11) drives a PTO wet clutch (12) which when engaged drives a PTO output shaft (13). The driveline has an eccentric formation (34) on the input shaft (11) which oscillates a pumping piston (31) when the input shaft rotates, which piston pumps cooling/lubricating fluid from a reservoir (25c) to the wet clutch (12). The piston is connected with the eccentric formation by a ring (33) which surrounds the eccentric formation (34) and a hollow tube (32) which is attached to the ring and which carries the piston at a lower end, the piston oscillating inside a chamber (31a) when the input shaft rotates. The chamber (31a) is connected with the fluid reservoir (25c) and the oscillating piston pumps the fluid along the hollow tube (32) into the ring (33) which then delivers the fluid into internal passages (38) in the input shaft from where the fluid flows to the wet clutch.

10 Claims, 9 Drawing Sheets

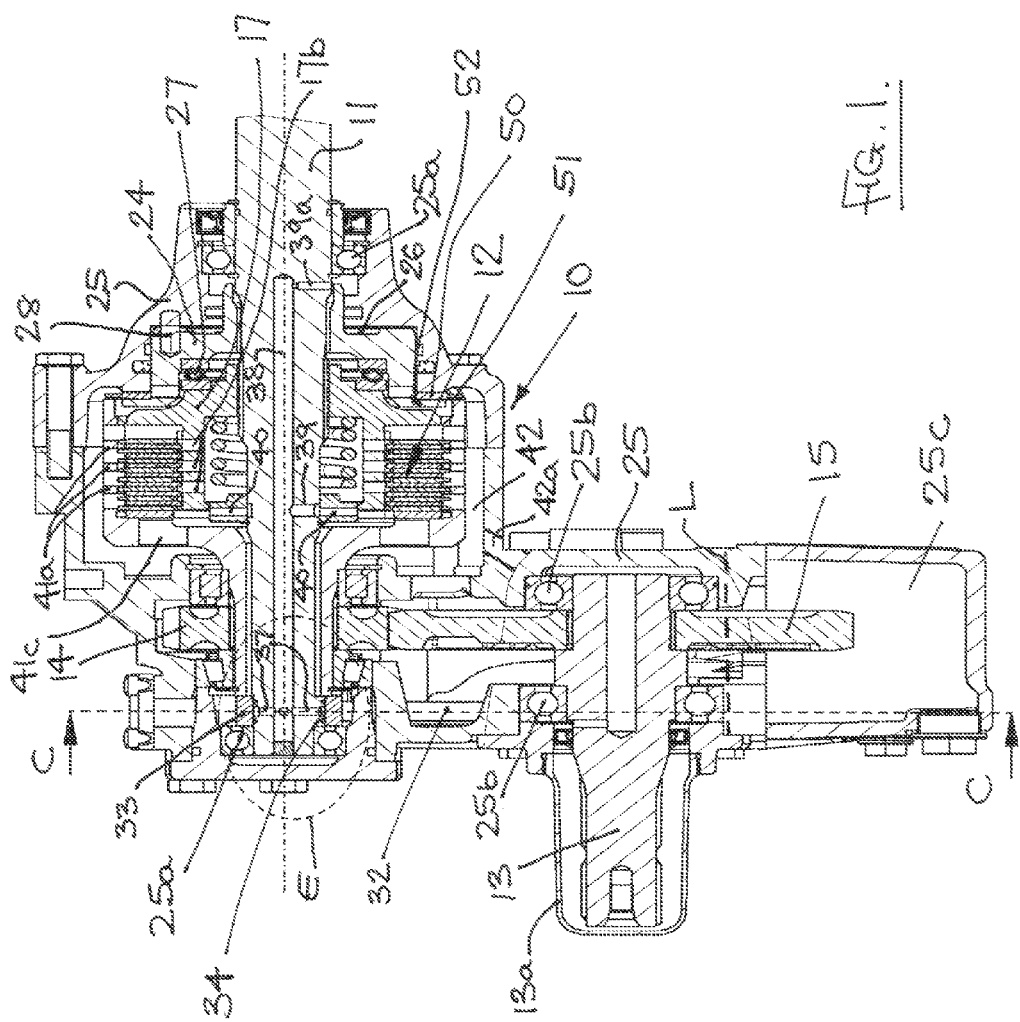

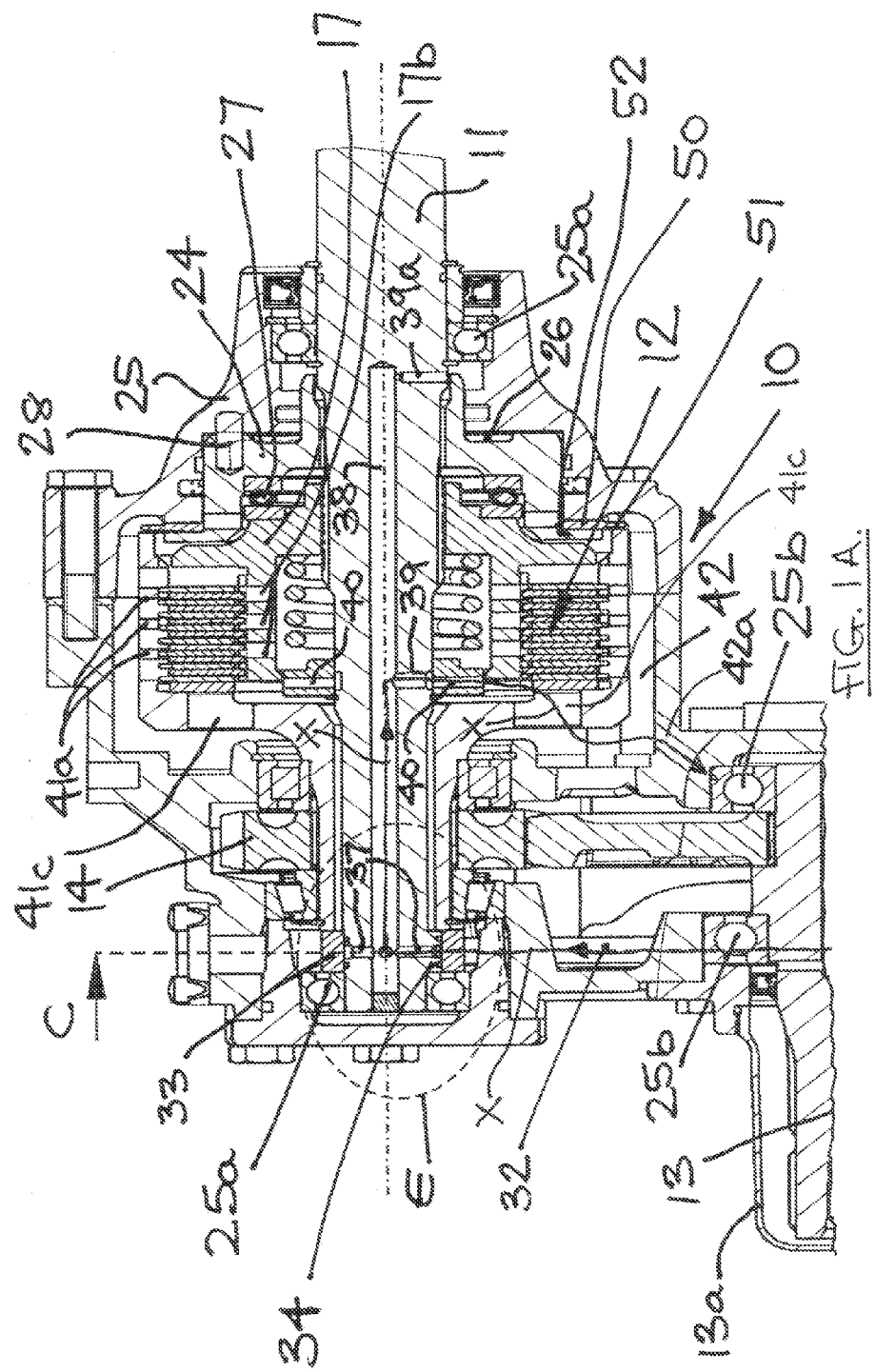

PTO DRIVELINES

BACKGROUND OF THE INVENTION

This invention relates to power take-off (PTO) drivelines for use in agricultural and industrial vehicles.

It is well known in, for example, agricultural tractors to provide a PTO driveline at the front or rear of the tractor which includes a wet clutch which when engaged delivers power to a PTO output shaft to drive an implement or attachment at the front or rear of the tractor. Such wet clutches are supplied with cooling/lubricating fluid from a reservoir in order to reduce wear of the clutch and prevent overheating.

The provision of a sufficient flow of cooling/lubricating fluid to such a wet clutch in an economic and efficient manner can cause problems.

It is an object of the present invention to provide an improved form of PTO driveline which is suitable for use in an agricultural tractor and which addresses the above fluid supply problem.

Thus according to the present invention there is provided a vehicle PTO driveline in which a PTO input shaft drives a PTO wet clutch which when engaged drives a PTO output shaft, the driveline having an eccentric formation on the input shaft which oscillates a pumping piston when the input shaft rotates, the oscillating piston pumping cooling/lubricating fluid around a circuit which includes the wet clutch and a fluid reservoir provided by part of a housing which encloses the driveline, characterised in that the piston is connected with the eccentric formation by a ring which surrounds the eccentric formation and a hollow tube which is attached to the ring and which carries the piston at a lower end, the piston oscillating inside a chamber when the input shaft rotates, said chamber being connected with the fluid reservoir and the oscillating piston pumping the fluid along the hollow tube into the ring which then delivers the fluid into internal passages in the input shaft from where the fluid flows to the wet clutch.

The oscillating piston draws the fluid from the reservoir via a non-return valve arrangement.

The wet clutch may be a multi-plate clutch engaged by an end pressure plate which is moved hydraulically or mechanically to engage the clutch and thus drive the PTO output shaft.

The driveline may be arranged so that when the PTO wet clutch is disengaged flow of fluid to the wet clutch is cut-off to reduce drag across the wet clutch.

The wet clutch may be connected with the output shaft via reduction gearing and a free play device may be provided in the drive line on the input side of the reduction gearing which allows limited rotation of the output shaft when the output shaft is stationary.

A driveline in accordance with the present invention is particularly suitable for use as the front PTO driveline of a tractor due to its inherent simplicity and compactness.

The PTO clutch may be connected with the output shaft via reduction gearing and a limited rotational free play device may be provided in the driveline on the input side of the reduction gearing which allows limited manual rotation of the output shaft by a vehicle operator when the output shaft is not driven by the clutch.

In such an arrangement the PTO clutch may include a brake which has a brake disc rotatable with the output shaft and which, when the clutch is not engaged, is held against a braking surface on a housing of the driveline to stop rotation of the PTO output shaft.

The brake disc may be is splined to an output member of the clutch by lugs which engage circumferentially extending cut outs in the output member, the limited rotation of the PTO output shaft being limited by the circumferential extent of the cut outs.

OVERVIEW OF THE INVENTION

The clutch may be engaged by a hydraulic piston and disengaged by a spring, the spring automatically applying the brake when the hydraulic piston is not pressurised.

The clutch may be coaxial with the input shaft and the output shaft may rotate about an axis laterally displaced from the axis of rotation of the input shaft and may be connected thereto by the reduction gearing.

BREIF DESCRIPTION OF THE DRAWINGS

One embodiment of the present invention as applied to an agricultural tractor driveline will now be described, by way of example only, with reference to the accompanying drawings in which:

FIG. 1 shows a longitudinal section on line A-A of FIG. 2;

FIG. 1A shows part of FIG. 1 on a larger scale for clarity;

FIG. 3 shows a longitudinal section on the line B-B of FIG. 2;

DETAILED DESCRIPTION OF EXAMPLE EMBODIMENTS

Figure 2:
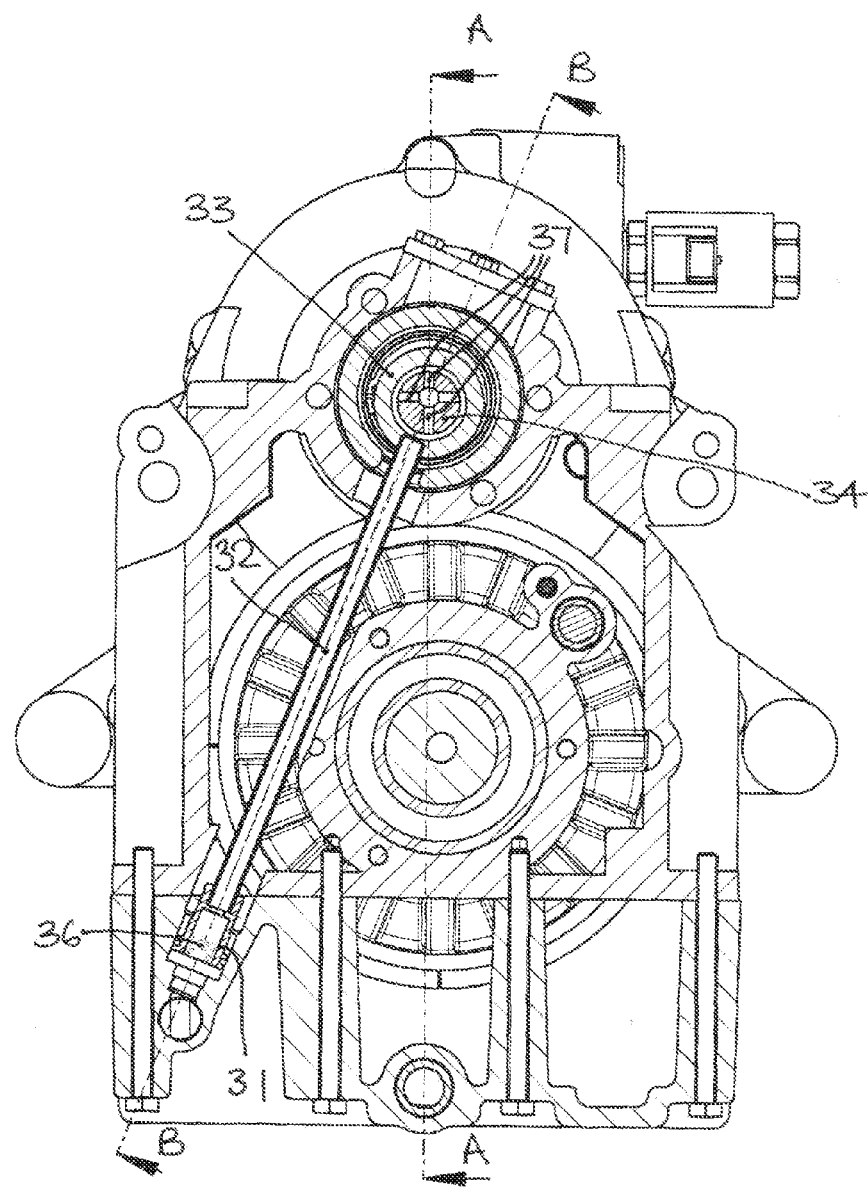
FIG. 2 shows a transverse section on the line C-C of FIG. 1.
Figure 2:
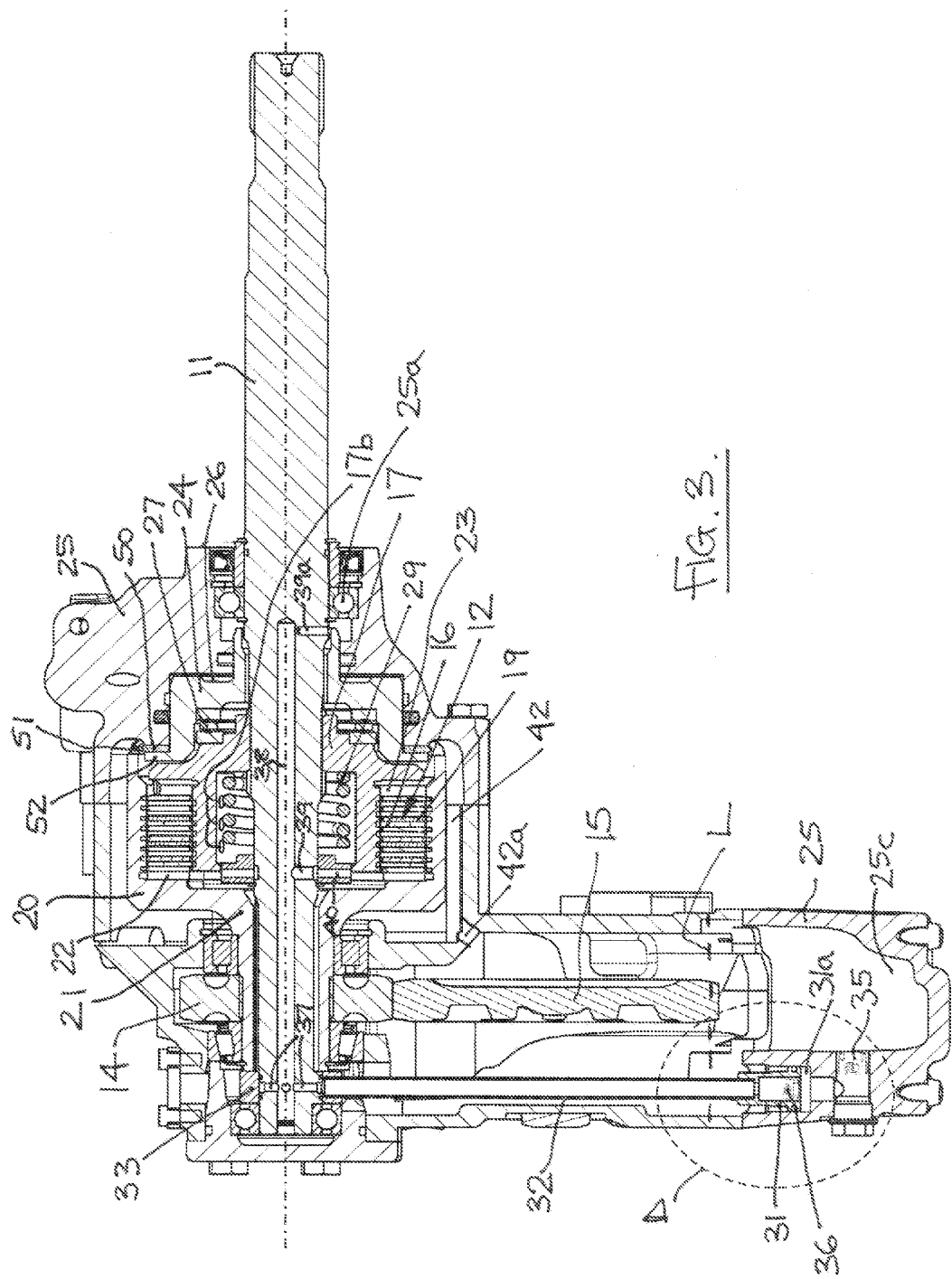

Referring to the drawings, a front PTO driveline 10 for an agricultural tractor has an input shaft 11 supported within a housing 25 which is in three parts via bearings 25a. Shaft 11 drives a PTO wet clutch 12 which, when engaged, drives a PTO output shaft 13, supported in housing 25 via bearings 25b. Shaft 13 is driven from clutch 12 via meshing gears 14 and 15 and has the customary removable protective cover 13a.

Wet clutch 12 includes a first set of annular clutch plates 16 which are splined at their inner peripheries to a piston 17 which is in turn splined at 18 to input shaft 11. A second set of annular clutch plates 19 are interleaved with plates 16 and are splined at their outer peripheries to an outer clutch housing 20 which has an output tube 21 which surrounds input shaft 11 and which is splined to gear 14. Clutch plates 16 and 19 are located between a reaction ring 22 which is splined onto housing 20 and a pressure plate 23 which is splined onto piston 17. Clutch 12 is engaged by an actuating piston 24 which is displaceable relative to outer housing 25 by pressurising a hydraulic chamber 26. Actuating piston 24 presses on piston 17 via bearing 27 and is prevented from rotating relative to housing 25 by pin 28. A spring 29 acts between piston 17 and an abutment ring 30 located on shaft 11 by a split ring 30a to move piston 17 to the right relative to shaft 11 to disengage the clutch when chamber 26 is not pressurised.

Thus clutch 12 is engaged by pressurising chamber 26 which moves pistons 24 and 17 to the left and thus causes pressure plate 23 to press plates 16 and 19 into contact with each other against reaction ring 22 to transmit drive from input shaft 11 to output tube 21 and hence to gears 14 and 15 thus driving PTO output shaft 13.

In accordance with the present invention wet clutch 12 is provided with a supply of pressurised cooling/lubricating fluid by a reciprocating piston 31 which is carried on the lower end of a pipe 32 connected to a ring 33 which surrounds an eccentric formation 34 formed on or carried by the input shaft 11. Ring 33 is sealed to formation 34 by seals 33a.

Figure 4:
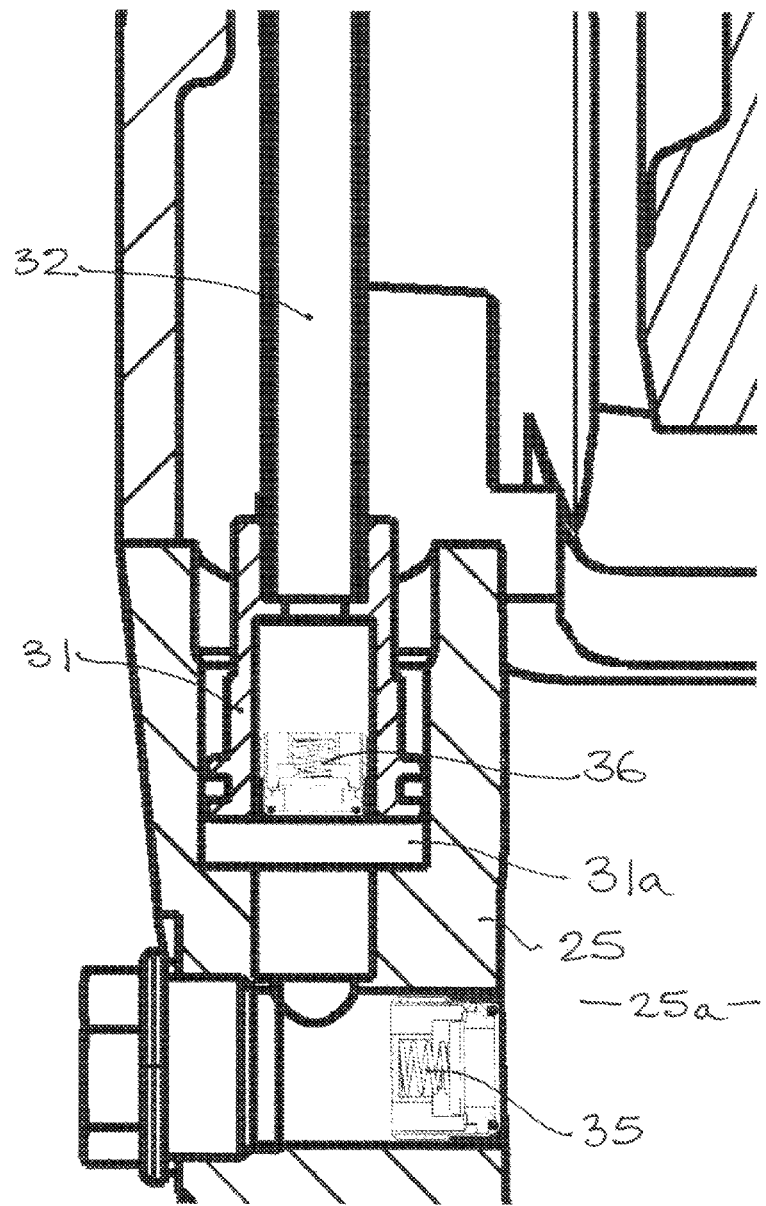
FIG. 4 shows detail D of FIG. 3 on a larger scale.
Figure 5:
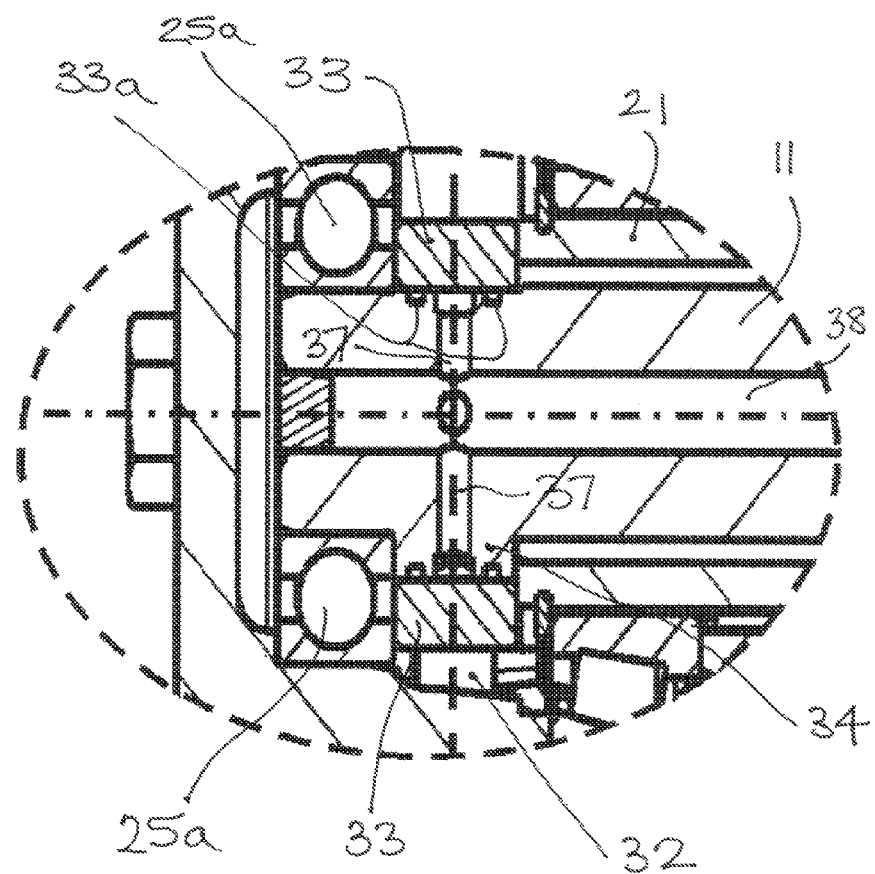
FIG. 5 shows detail E of FIG. 1 on a larger scale.

As can be seen from FIGS. 2 and 4, as formation 34 rotates with shaft 11 piston 31 oscillates inside a chamber 31a formed in the lower part of housing 25 and thus draws fluid from a reservoir 25c, having an oil level L, formed by the interior of the lower part of housing 25.

Piston 31 draws fluid into chamber 31a via non-return valve 35 and then forces fluid up tube 32 via a further non-return valve 36. Fluid exits from the top of tube 32 into the interior of ring 33 and hence via radial drillings 37 in the eccentric formation 33 into an axial passage 38 in the input shaft 11.

If the clutch is not engaged, oil passes from passage 38 via radial drilling 39 in shaft 11 and drillings 40 in abutment ring 30 into the area where the clutch plates 16/19 are housed. The oil can flow to the passage 41c on the left side of plates 16/19 and hence return to the reservoir 25c via drilling 42a without excessive drag losses (see arrows X in FIG. 1A).

Figure 3A:
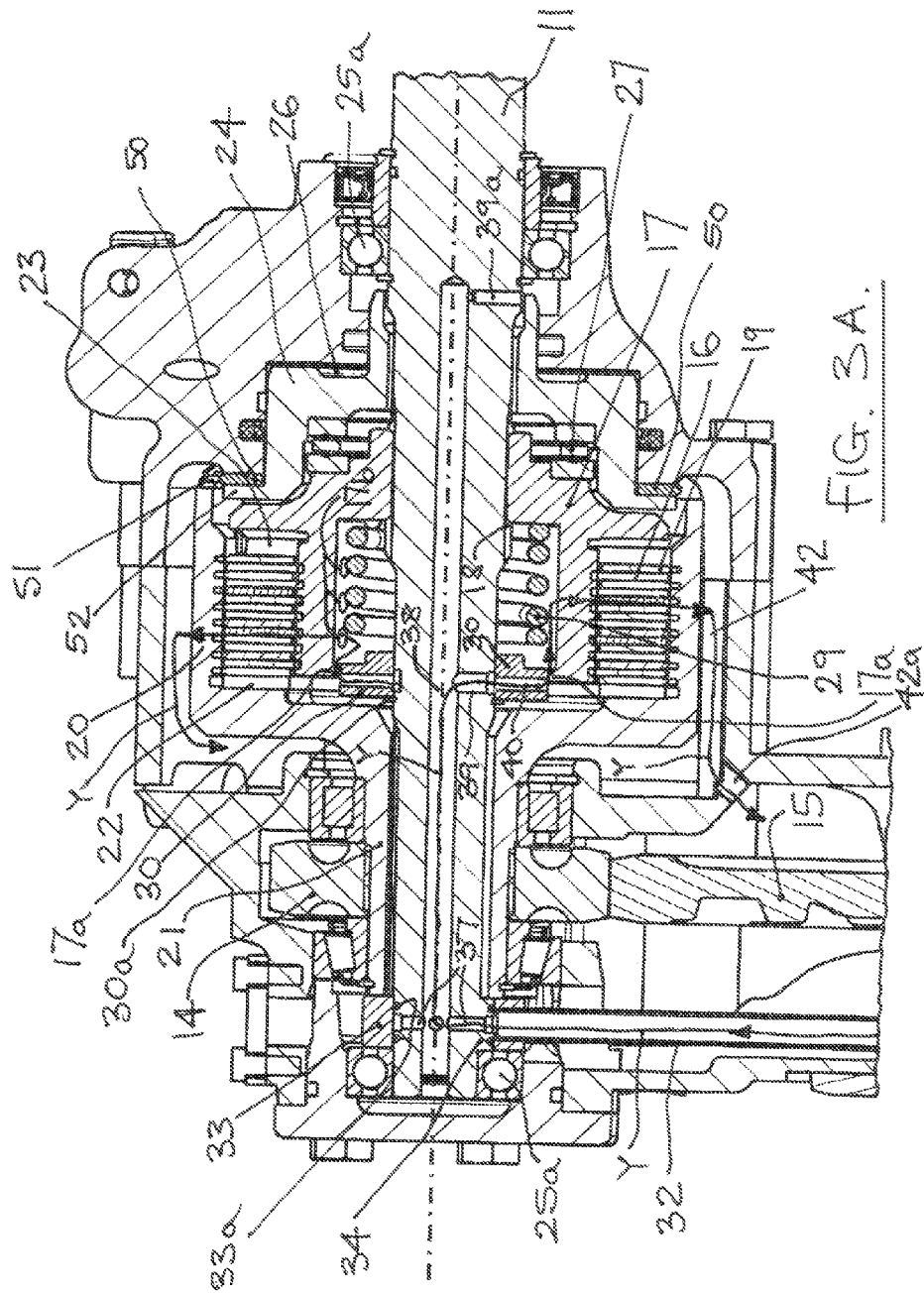
FIG. 3A shows part of FIG. 3 on a larger scale for clarity.

If the clutch is engaged, control edge 17a (see FIG. 3A) of piston 17 blocks the oil flow into drilling 40 so that oil enters the chamber housing spring 29. The centrifugal forces throw the oil through the holes 17b into the area between clutch plates 16 and clutch plates 19 to provide optimum cooling. After passing the clutch plates 16/19, oil exits through the outer periphery of the clutch housing via holes 41a and returns to reservoir 25c via clearance 42 and drilling 42a (see arrows Y in FIG. 3A).

Fluid also flows from passage 38 to bearings 25a via drilling 39a.

Figure 6:
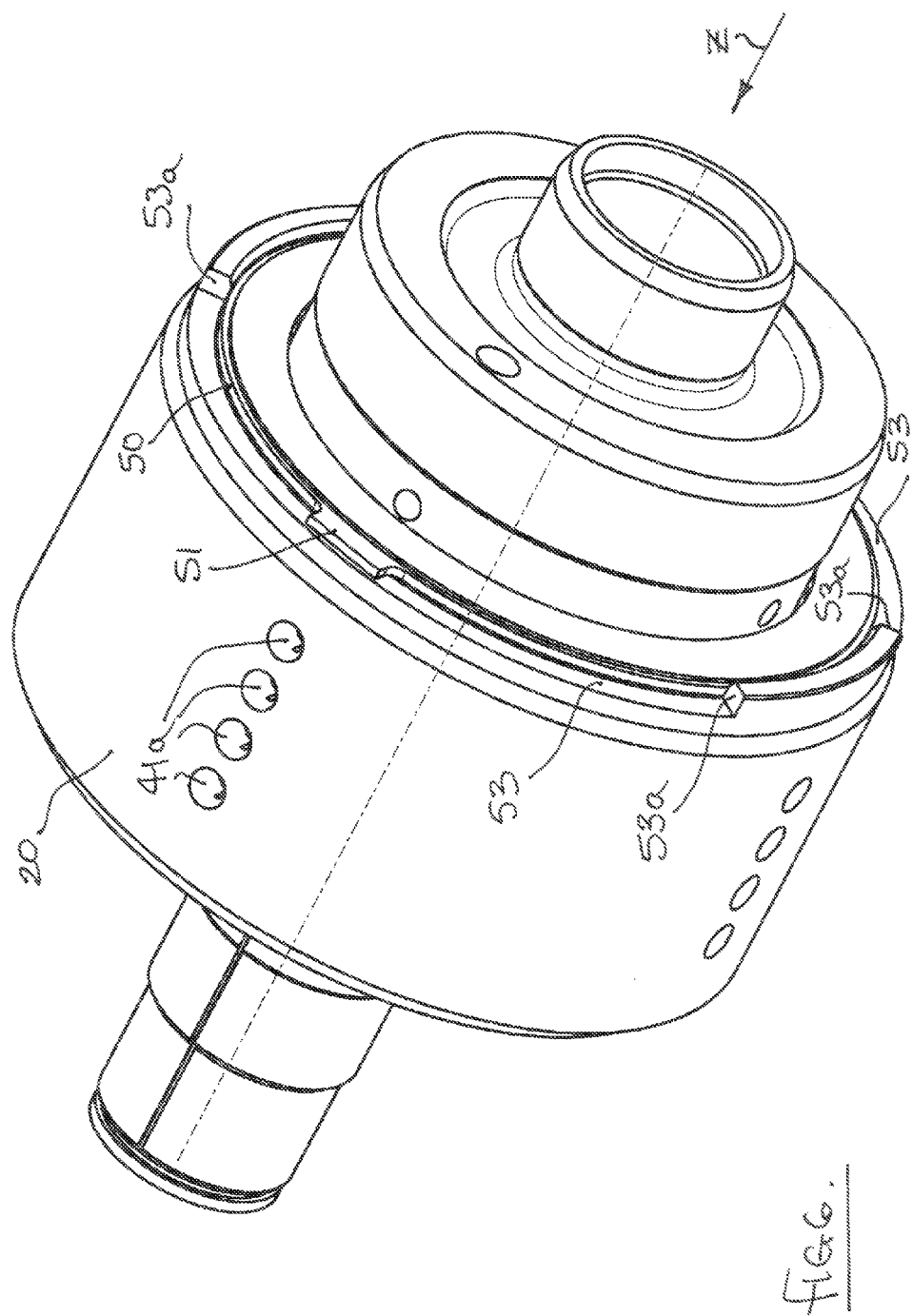
FIG. 6 shows a perspective view of a wet clutch assembly used in the driveline.
Figure 7:
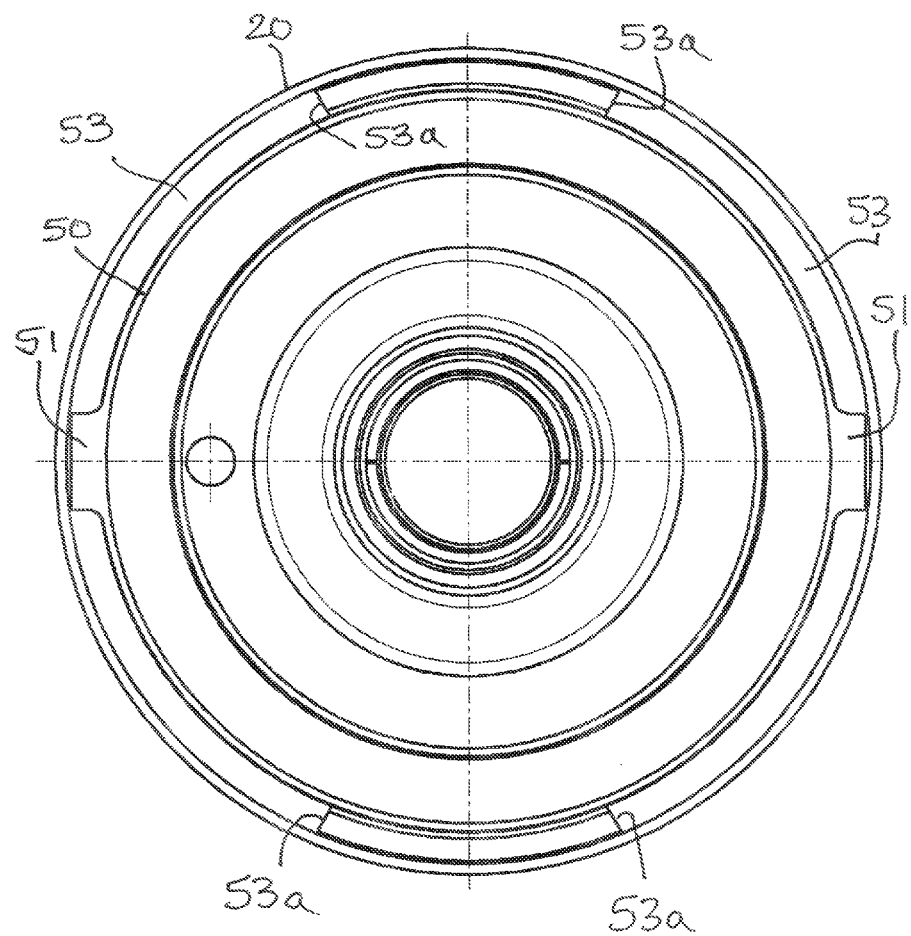
FIG. 7 shows an end view of the wet clutch assembly of FIG. 6 viewed in the direction of the arrow Z of FIG. 6.

The PTO drive arrangement is also provided with a brake facility to brake the PTO output shaft 13 when the clutch 12 is disengaged. This brake takes the form of a brake disc 50 which is splined by lugs 51 for rotation with housing 20. Brake disc 50 is located between housing 25 and a flange 52 provided on actuating piston 24 so that when chamber 26 is not pressurised spring 29 forces piston 17 to bring braking disc 50 into contact with housing 25 and thus hold housing 20 and hence output shaft 13 against rotation. Lugs 51 engage circumferentially long cut outs 53 (see FIGS. 6 and 7) in the end of housing 20. Thus when PTO output shaft 13 is held stationary by the above brake arrangement it is still possible for the tractor operator to rotate the output shaft by hand due through a limited angle (typically 120 degrees) due to the rotational free play between the lugs 51 and the ends 53a of the cut outs 53. This free play greatly facilitates coupling of the output shaft to the implement or attachment which the PTO shaft is to drive.

By locating the free play device on the input side of the reduction gearing 14 and 15 the torque experienced by lugs 51 is reduced since housing 20 is rotating at a higher speed than the output shaft 13. Thus lugs 51 can be of a less robust construction.

Also the brake disc 50 and the lugs 51 is of a simple flat construction and the free play function can be provided simply by machining circumferentially long cut outs 53 in the end of housing 20. Thus the brake and free play function can be provided simply, cheaply and efficiently.

The above braking and free play arrangement is the subject of the Applicant's co-pending UK patent application No. 1218237.4.

The invention claimed is:

1. A vehicle PTO driveline in which a PTO input shaft drives a PTO wet clutch which when engaged drives a PTO output shaft, the driveline having an eccentric formation on the input shaft which oscillates a pumping piston when the input shaft rotates, the oscillating piston pumping cooling/lubricating fluid around a circuit which includes the wet clutch and a fluid reservoir provided by part of a housing which encloses the driveline, characterized in that the piston is connected with the eccentric formation by a ring which surrounds the eccentric formation and a hollow tube which is attached at an upper end to the ring and which carries the piston at a lower end, the piston oscillating inside a chamber when the input shaft rotates, said chamber being connected with the fluid reservoir and the oscillating piston pumping the fluid along the hollow tube into the ring which then delivers the fluid into internal passages in the input shaft from where the fluid flows to the wet clutch.

2. A driveline according to claim 1 in which the oscillating piston draws the fluid from the reservoir via a non-return valve arrangement.

3. A driveline according to claim 1 in which the wet clutch is a multi-plate clutch engaged by an end pressure plate which is moved hydraulically or mechanically to engage the clutch and thus drive the PTO output shaft.

4. A driveline according to claim 1 in which when the PTO wet clutch is disengaged flow of fluid to the wet clutch is cut-off to reduce drag across the wet clutch.

5. A driveline according to claim 1 in which the PTO clutch is connected with the output shaft via reduction gearing and a limited rotational free play device is provided in the driveline on the input side of the reduction gearing which allows limited manual rotation of the output shaft by a vehicle operator when the output shaft is not driven by the clutch.

6. A driveline according to claim 5 in which the PTO clutch includes a brake which has a brake disc rotatable with the output shaft and which, when the clutch is not engaged, is held against a braking surface on a housing of the driveline to stop rotation of the PTO output shaft.

7. A driveline according to claim 6 in which the brake disc is splined to an output member of the clutch by lugs which engage circumferentially extending cut outs in the output member, the limited rotation of the PTO output shaft being limited by the circumferential extent of the cut outs.

8. A driveline according to claim 5 in which the clutch is engaged by a hydraulic piston and disengaged by a spring, the spring automatically applying the brake when the hydraulic piston is not pressurized.

9. A driveline according to claim 5 in which the clutch is coaxial with the input shaft and the output shaft rotates about an axis laterally displaced from the axis of rotation of the input shaft and is connected thereto by the reduction gearing.

10. A vehicle PTO driveline in which a PTO input shaft drives a PTO wet clutch which when engaged drives a PTO output shaft, the driveline having an eccentric formation on the input shaft which oscillates a pumping piston when the input shaft rotates, the oscillating piston pumping cooling/lubricating fluid around a circuit which includes the wet clutch and a fluid reservoir provided by part of a housing which encloses the driveline, characterized in that the piston is connected with the eccentric formation by a ring which surrounds the eccentric formation and a hollow tube which is attached to the ring and which carries the piston at a lower end, the piston oscillating inside a chamber when the input shaft rotates, said chamber being connected with the fluid reservoir and the oscillating piston pumping the fluid along the hollow tube into the ring which then delivers the fluid into internal passages in the input shaft from where the fluid flows to the wet clutch, and in that when the PTO wet clutch is disengaged flow of fluid to the wet clutch is cut-off to reduce drag across the wet clutch.

* * * * *